United States Patent [19]

Antonini

[11] Patent Number: 4,747,605
[45] Date of Patent: May 31, 1988

[54] FLUID PRESSURE SEAL WITH PRESSURE DISTORTION BARRIER

[75] Inventor: Joseph Antonini, Chicago, Ill.
[73] Assignee: Dana Corporation, Toledo, Ohio
[21] Appl. No.: 868,458
[22] Filed: May 30, 1986
[51] Int. Cl.⁴ .............................................. F16J 15/32
[52] U.S. Cl. ................................. 277/153; 277/188 A
[58] Field of Search ................... 277/152, 153, 37, 35, 277/24, 84, 188 A, 188 R

[56] References Cited

U.S. PATENT DOCUMENTS

| | | |
|---|---|---|
| 2,208,482 | 7/1940 | Victor . |
| 2,992,027 | 7/1961 | Wright et al. ................... 277/153 X |
| 3,253,898 | 6/1966 | Herbenar ............................. 277/47 |
| 3,394,939 | 7/1968 | Mastro .................................. 277/1 |
| 3,455,564 | 7/1969 | Dega .................................. 277/153 |
| 3,495,843 | 2/1970 | Andersen et al. ............. 277/153 X |
| 4,053,166 | 10/1977 | Domkowski ....................... 277/152 |
| 4,300,778 | 11/1981 | Gagne ................................ 277/153 |
| 4,427,206 | 1/1984 | Sugiyama .......................... 277/153 |
| 4,448,461 | 5/1984 | Otto ................................ 277/29 X |
| 4,504,067 | 3/1985 | Cather, Jr. ........................ 277/153 |

FOREIGN PATENT DOCUMENTS

| 0055758 | 5/1981 | Japan .................................. 277/153 |
|---|---|---|
| 0033790 | 8/1984 | Japan .................................. 277/153 |

*Primary Examiner*—Stuart S. Levy
*Assistant Examiner*—Thomas R. Hannon
*Attorney, Agent, or Firm*—F. B. McDonald

[57] ABSTRACT

A fluid pressure seal assembly is adapted to accomodate high and low pressure conditions in hydraulic oil environments. In a preferred form, the seal assembly includes a primary shaft sealing annulus having a radially inwardly extending circumferential sealing lip defined by a pair of outer and inner converging frustoconcial walls. During a low pressure mode, the sealing lip provides contact with the shaft being sealed. During a high pressure mode, the inner frustoconical wall provides a surface contact with the shaft. A rigid metallic support component is disposed for limiting axial movement of the annulus, the support component being a part of a steel J-casing which structurally supports a body of elastomer bonded thereto. In a preferred form the support component of the casing member is encased by a portion of the body of elastomeric material to form a barrier which limits the amount of high pressure deformation of the sealing annulus. Also, in a preferred form the sealing annulus is spaced from the barrier during low pressure sealing conditions, whereby a gap is defined between the primary sealing annulus and the barrier. During high pressure sealing, the gap is closed as the sealing annulus is forced against the barrier and the inner frustoconical wall makes surface contact with the shaft.

8 Claims, 2 Drawing Sheets

FLUID PRESSURE SEAL WITH PRESSURE DISTORTION BARRIER

BACKGROUND OF THE INVENTION

This invention relates to fluid pressure seal assemblies of a type associated with pressurized hydraulic oil systems. More particularly, the invention relates to a fluid pressure seal assembly adapted for handling cyclical and/or fluctuating fluid pressures up to 1500 pounds per square inch.

There are numerous fluid pressure seal assemblies in the prior art capable of withstanding significant hydraulic pressures. However, most are cumbersome to fabricate, and require elaborate tooling in their manufacture. A relatively large number of such prior art fluid seal assemblies are designed in two or more separate parts, and are plagued with inherent problems of internal leakage. However, even where such seal assemblies are formed in composite structures, they are inadequate to maintain a relatively rigid structure under cyclical high pressure operations. Thus when so subjected, such seals tend to leak prematurely due to structural distortion. Consequent early seal deterioration results from the distortion.

SUMMARY OF THE INVENTION

The fluid pressure seal assembly described herein provides a composite unitary seal assembly capable of withstanding cyclic pressures up to 1500 pounds per square inch without significant high pressure distortion. In a preferred form, a barrier support portion of the seal includes an integral metallic support component oriented axially to a pressurized side of the seal. An elastomeric body is molded over the metallic (preferably steel) support to define a composite steel reinforced elastomeric barrier against which a primary sealing annulus formed of elastomer only may be supported upon deformation thereof during high pressures.

In a preferred embodiment, the assembly includes the primary shaft sealing annulus which includes a radially inwardly extending circumferential sealing lip defined by a pair of axially oriented outer and inner converging frustoconical walls. Under low pressures, the sealing lip makes a line contact with an operatively moveable shaft. In a high pressure mode, the sealing annulus is deformed away from the pressure side of the seal and pressed against the aforedescribed barrier, whereby the barrier provides a distortion limit, and enables the inner frustoconical wall to provide a positive surface contact against the shaft for improved high pressure sealing.

Also in the preferred embodiment, the metallic barrier component is part of a structural metallic J-shaped casing to which all elastomeric body portions of the seal are bonded. The seal assembly also includes a secondary sealing annulus axially spaced from the primary sealing annulus. The aforedescribed barrier is positioned intermediately of the primary and secondary sealing annuli.

DETAILED DESCRIPTION OF A PREFERRED EMBODIMENT

Figure 1:
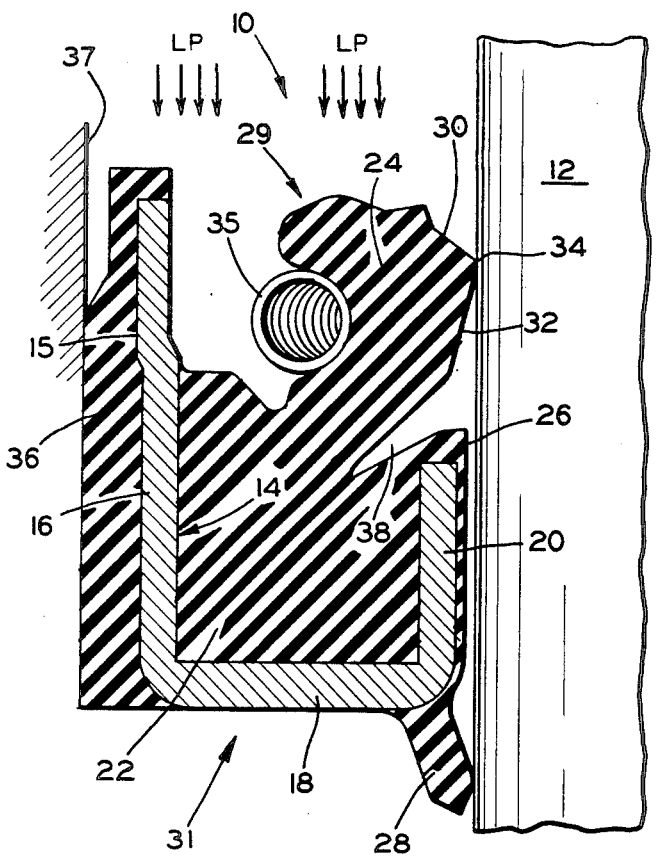
FIG. 1 is a fragmentary cross-sectional view of a preferred embodiment of a fluid pressure seal assembly manufactured in accordance with the present invention, shown in engagement with a rotary shaft member.

Referring initially to FIG. 1, a unitary fluid pressure seal assembly 10 is in sealing contact with a shaft 12, shown fragmentarily. The assembly 10 includes a metallic J-casing 14, preferably made of steel, which provides a rigid structure for supporting an elastomeric seal body 22 which is bonded thereto. The J-casing 14 comprises a backbone 16, a radially extending component 18 integrally connected with the backbone, and a barrier support component 20 which provides rigid support to a barrier subportion 26 of the elastomeric body 22. Integral to the elastomeric body 22 is a primary shaft sealing annulus 24 which surrounds the shaft 12, and includes a circumferentially disposed sealing lip 34 which makes a line contact with the shaft when the annulus 24 is subjected to low pressure.

The seal assembly 10 is suitable for operations under varying pressure conditions ranging up to at least 1500 pounds per square inch. A preferred use of the assembly 10 is for sealing a pinion motor shaft of a power steering unit at the point where the pinion shaft extends from the hydraulic motor housing. Such steering units are used conventionally in power steering applications involving rack and pinion steering gear systems. As those skilled in the art will appreciate, pressure is applied over spontaneous and sporadic cycles, and depends at any given time on the amount of steering effort being employed in the driving of an associated vehicle.

Under low pressure periods of the pressure cycle, represented in FIG. 1 by the multiple "LP" arrows, the lip 34 will satisfactorily seal the pinion shaft 12 against escape of hydraulic oil from the hydraulic or pressure side 29 of the sealing annulus 24. The sealing lip 34 is defined by an outer frustoconical wall 30 and an inner frustoconical wall 32, as shown, having substantially axial orientations relative to the shaft 12. A garter spring 35 is utilized for biasing the primary shaft sealing annulus 24 radially inwardly so as to achieve an optimum contact of the lip 34 on the shaft 12.

It will be noted that the assembly 10 also includes a secondary sealing annulus 28 which operates as a dust seal on the non-pressurized or air side 31 of the seal assembly 10. In addition, in a preferred embodiment, a shaft bore housing seal 36 is circumferentially bonded to the exterior periphery 15 of the backbone 16 to form a sealing medium between the pinion shaft housing bore 37 and the shaft 12.

Figure 2:
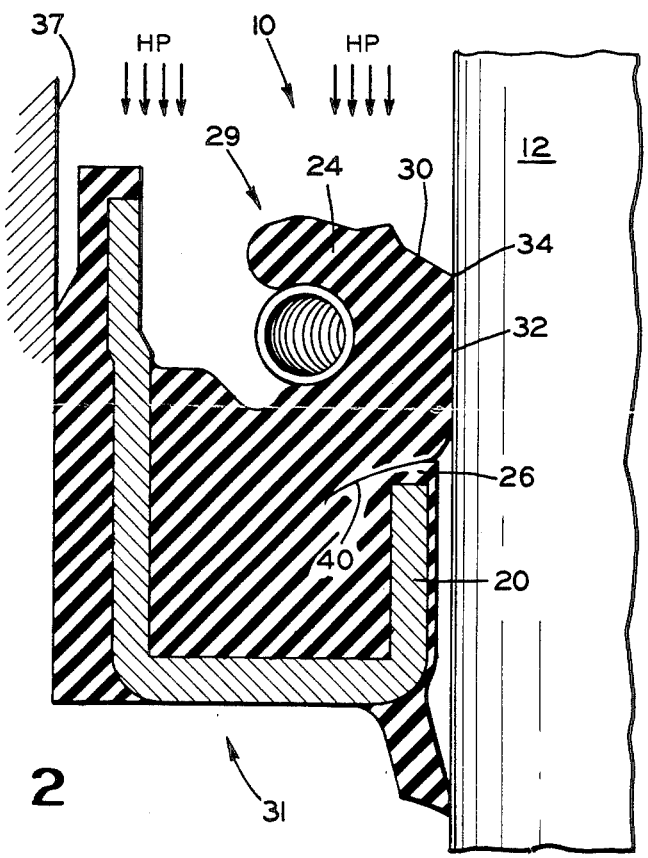
FIG. 2 is a cross-sectional view of the same embodiment, wherein the primary sealing annulus is shown deformed during application of high pressure.

As noted earlier, under low pressures sealing of the shaft is adequately performed by the line contact established by the sealing lip 34. In the low pressure sealing mode, the elastomeric body 22 includes a V-gap 38 between the primary sealing annulus 24 and the barrier subportion 26. However, referring now to FIG. 2, during high pressures, represented by the multiple "HP" arrows, the primary shaft sealing annulus 24 is forced downwardly against the barrier 26 as shown at 40 wherein the V-gap 38 of FIG. 1 is closed. At this point the inner frustoconical wall 32 provides a surface contact wtih the shaft to establish a high pressure sealing mode.

The extra rigidity imparted to the barrier 26 by the steel support component 20 of the presently preferred embodiment more effectively limits distortion of the barrier 26 in a manner superior to the experience of the prior art. Thus, when the primary annulus 24 is pressed against the barrier under high pressure conditions, leakage is successfully avoided because the barrier 26 is not prone to axial distortion.

Figure 3:
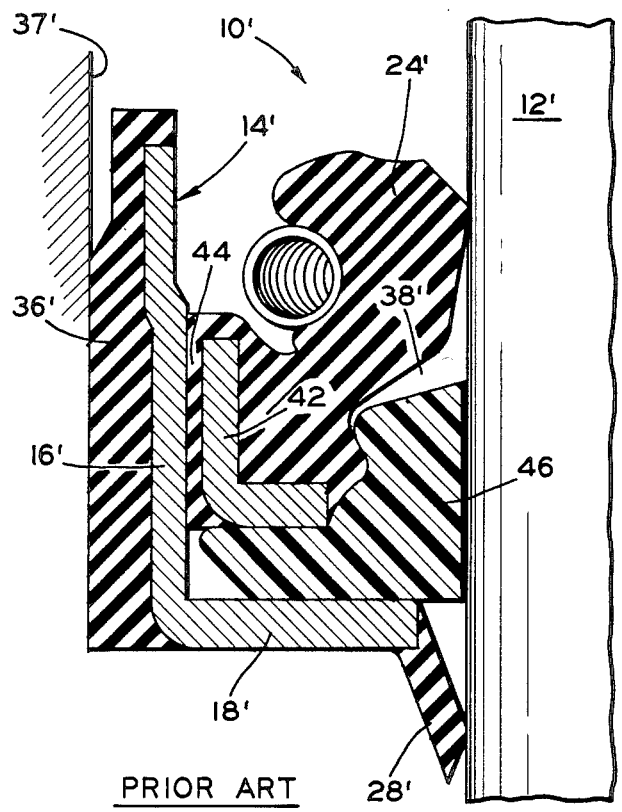
FIG. 3 is a prior art seal utilized for the same purpose as the seal of the present invention.
Figure 4:
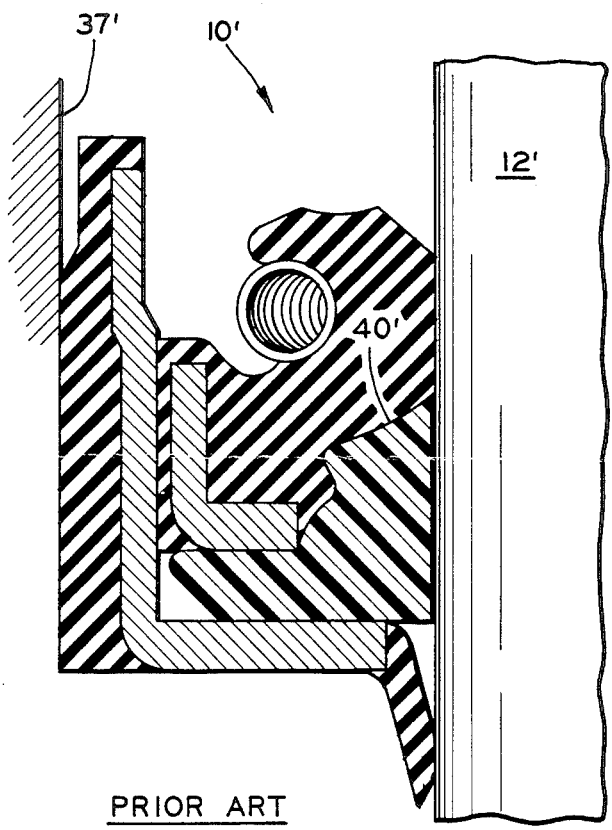
FIG. 4 is a view of the prior art seal of FIG. 3 subjected to high pressure conditions analogous to those of FIG. 2.

Referring now to FIGS. 3 and 4, a three-piece seal assembly system of prior art is shown in cross section. It will be noted that the sealing annulus 24' is analogous to the primary shaft sealing annulus 24 of the presently preferred embodiment. However, in the prior art embodiments of FIGS. 3 and 4, the sealing annulus 24' contains an L-casing portion 42 and is separate from the backbone 16'. It will be noted that it is necessary to provide the sealing annulus 24' with an outer seal portion 44 for the purpose of sealing between the backbone 16' and the sealing annulus 24', to the extent that the latter components must fit telescopically together. Moreover, the plastic barrier insert 46 which is analogous to the integral barrier 26 of the present invention must be inserted within the backbone component 16' before insertion of the sealing annulus 24'.

By comparison, the presently preferred seal assembly 10 is much simpler to manufacture as it requires less costly tooling. It is much easier to install as it is manufactured as a unitary bonded composite. It is also less susceptible to internal leakage, particularly to the extent that the press-fit interface between the back-bone 16' and the outer seal portion 44 has been totally eliminated. Finally, to the extent that the barrier 26 is reinforced by a structural support component 20, the barrier is not prone to distortion, and hence provides a more viable shaft sealing contact under high pressure conditions.

Although only one embodiment has been shown and described herein, the claims of the present invention are believed to cover numerous embodiments which will fall within the spirit and scope thereof.

What is claimed is:

1. In a fluid pressure seal assembly including a primary shaft sealing annulus having a radially inwardly extending circumferential sealing lip defined by a pair of axially oriented outer and inner converging frustoconical walls, means for biasing said shaft sealing annulus radially inwardly for establishing sealing contact with an operatively moveable shaft, said assembly further having a pressure side on said annulus, and including means for limiting axial movement of said sealing annulus; an improvement comprising said means for limiting axial movement of said sealing annulus comprising a rigid axially extending support component disposed for limiting axial movement of said sealing annulus in a direction away from said pressure side of said annulus, wherein said support and said annulus comprise a unitary composite, wherein said means for limiting axial movement of said sealing annulus further comprises an elastomeric material bonded to said axially extending support component to define a rigid axial barrier, wherein said elastomeric material is integral with said sealing annulus.

2. The fluid pressure seal assembly of claim 1 further comprising a structural J-casing element, and wherein said rigid support component comprises an integral portion of said J-casing, said J-casing supporting said sealing annulus and comprising a rigid backbone member, a radially extending component integral with the backbone, said radial component being integral with said rigid support component.

3. The fluid pressure seal assembly of claim 2 wherein said assembly comprises a dual sealing mode for high and low pressures, wherein during low pressures said sealing lip provides a line contact with said shaft, and wherein said sealing annulus and said barrier are spaced apart to define an axial gap between said members.

4. The fluid pressure seal assembly of claim 3 wherein during said high pressure sealing mode said inner converging frustoconical wall makes a surface contact with said shaft, and wherein said sealing annulus contacts said barrier and closes said gap.

5. The fluid pressure seal assembly of claim 4 wherein said J-casing member is formed of steel.

6. The fluid pressure seal assembly of claim 5 wherein said assembly includes an external secondary sealing annulus axially spaced from said primary sealing annulus, said barrier positioned intermediately of said primary and secondary sealing annuli.

7. The fluid pressure seal assembly of claim 6 wherein said means for biasing said primary shaft sealing annulus against said shaft comprises a coiled garter spring.

8. The fluid pressure seal assembly of claim 7 wherein said pressure side of said annulus is disposed for accommodating pressures up to 1500 pounds per square inch.

* * * * *